NOD22 OR RE 3,803

Reissue of Patent dated Jan. 26. 1869.

P. & F. Corbin, assignors to F. J. Stracker. Design for Hinges.

REISSUED JAN 18 1870

3803

Witnesses
Geo. D. Walker
Chas. H. Smith

P. & F. Corbin
per L. A. Serrell
Atty.

United States Patent Office.

P. CORBIN AND F. CORBIN, OF NEW BRITAIN, CONNECTICUT, ASSIGNEES OF FRANCIS T. FRACKER.

*Design No. 3,354, dated January 26, 1869; reissue No. 3,803, dated January 18, 1870.*

DESIGN FOR A HINGE.

The Schedule referred to in these Letters Patent and making part of the same.

*To all whom it may concern:*

Be it known that FRANCIS T. FRACKER, of Boston, in the county of Suffolk, and State of Massachusetts, did invent or produce a new and original Design for Hinges; and the following is hereby declared to be a full, clear, and exact description of the said design, reference being had to the annexed drawing, making part of this specification, wherein—

Figure 1:
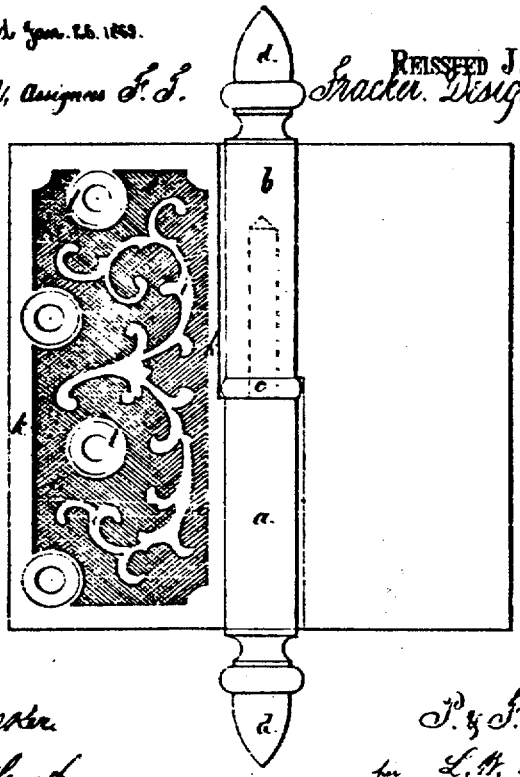
Figure 2:
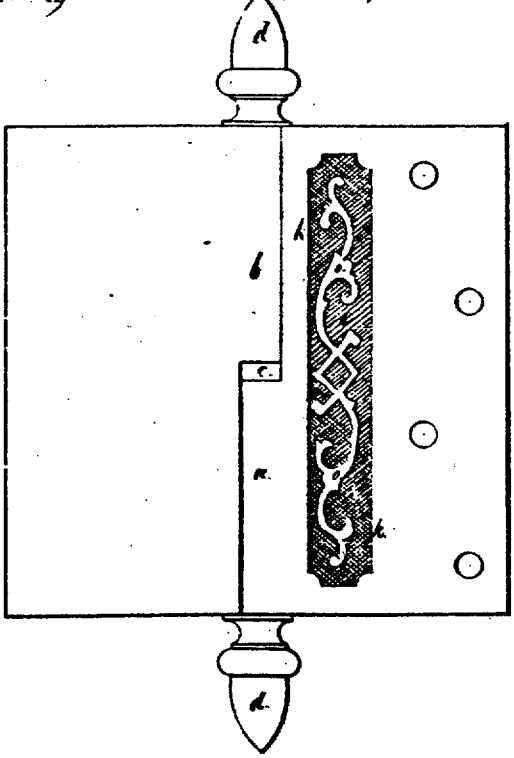

Figure 1 represents a hinge, open, with said design applied to one of the faces thereof, and Figure 2 is a similar view, showing the design placed upon the back of the hinge.

It is to be understood that usually the same design will be applied to the surfaces of both leaves of the hinge.

The hinge represented is a two-part slip-hinge, with a pin projecting from the boss *a* into a hole in the boss *b*, with a washer, *c*, between, and ornaments *d d* at the ends of the bosses. Said design, however, does not relate to either of these parts, nor to the size or character of the hinge.

The said design consists in the ornamentation of the leaves of a cast but-hinge, by recessing the surface of such hinge, so as to form a panel, as at *e*, thereby leaving the edges of the surface raised, as at *k*, and surface contiguous to and partially or entirely surrounding the screw-holes, also raised, as at *l*.

The ornamental scroll-work *i i*, *o o*, and the imitation lace-work at the bottom of the recessed surface, may be as represented, but is not herein claimed.

What is claimed as the invention of the said FRANCIS T. FRACKER, is—

The ornamentation of cast but-hinges by a recessed panel, leaving the edges of the hinge and the surface contiguous to the screw-holes raised, substantially as described and represented.

Dated October 25, 1869.

F. H. NORTH, *President.*
CHARLES PECK, *Secretary.*

Witnesses:
F. T. STANLEY,
R. S. PORTER.